US009353861B2

(12) United States Patent
Ishibashi et al.

(10) Patent No.: US 9,353,861 B2
(45) Date of Patent: May 31, 2016

(54) COUPLING STRUCTURE FOR PISTON USED IN FLUID-PRESSURE CYLINDER, AND COUPLING METHOD THEREFOR

(75) Inventors: Koichiro Ishibashi, Tsukubamirai (JP); Koji Hara, Tsukubamirai (JP); Toshio Sato, Tsukuba (JP)

(73) Assignee: SMC KABUSHIKI KAISHA, Tokyo (JP)

( * ) Notice: Subject to any disclaimer, the term of this patent is extended or adjusted under 35 U.S.C. 154(b) by 286 days.

(21) Appl. No.: 14/117,637

(22) PCT Filed: May 21, 2012

(86) PCT No.: PCT/JP2012/062929
§ 371 (c)(1),
(2), (4) Date: Nov. 14, 2013

(87) PCT Pub. No.: WO2012/161159
PCT Pub. Date: Nov. 29, 2012

(65) Prior Publication Data
US 2014/0069271 A1 Mar. 13, 2014

(30) Foreign Application Priority Data
May 25, 2011 (JP) ................... 2011-116674

(51) Int. Cl.
*F16J 1/12* (2006.01)
*F16J 1/00* (2006.01)
*F15B 15/14* (2006.01)

(52) U.S. Cl.
CPC ............ *F16J 1/12* (2013.01); *F15B 15/1447* (2013.01); *F16J 1/008* (2013.01); *Y10T 29/49826* (2015.01)

(58) Field of Classification Search
CPC ............. F16J 1/10; F16J 1/12; F15B 15/1447
USPC ..................................... 92/84, 187
See application file for complete search history.

(56) References Cited

U.S. PATENT DOCUMENTS 5,442,993 A * 8/1995 Baliotti, II .......... F15B 15/1447
403/228

FOREIGN PATENT DOCUMENTS

| JP | 54 124170 | 9/1979 |
| JP | 9 507560 | 7/1997 |
| JP | 2003 56512 | 2/2003 |
| JP | 4067509 | 3/2008 |

OTHER PUBLICATIONS

International Search Report Issued Jul. 24, 2012 in PCT/JP12/062929 Filed May 21, 2012.

* cited by examiner

*Primary Examiner* — Thomas E Lazo
(74) *Attorney, Agent, or Firm* — Oblon, McClelland, Maier & Neustadt, L.L.P.

(57) ABSTRACT

A coupling structure for a piston used in a fluid-pressure cylinder. The piston in the fluid-pressure cylinder includes a piston hole that runs through a central part of the piston in an axial direction thereof. One end of a piston rod and a coupling body coupled to the one end are inserted into the piston hole. The coupling body includes: a main part that contacts the one end of the piston rod; and an angled part formed around the main part and inclined at a prescribed angle with respect thereto. When the coupling body is subjected to pressure inside the piston hole, the diameter of the coupling body increases and a pointed edge of the angled part engages with an inner surface of the piston hole such that the coupling body couples the piston and the piston rod.

17 Claims, 10 Drawing Sheets

COUPLING STRUCTURE FOR PISTON USED IN FLUID-PRESSURE CYLINDER, AND COUPLING METHOD THEREFOR

TECHNICAL FIELD

The present invention relates to a coupling structure and a coupling method for a piston, for connecting the piston and a piston rod, which are used in a fluid pressure cylinder that displaces the piston along the interior of a cylinder main body under the supply of a pressure fluid.

BACKGROUND ART

Heretofore, as means for transporting workpieces, for example, a fluid pressure cylinder has been used having a piston displaced upon supply of a pressure fluid. With such a fluid pressure cylinder, for example, as disclosed in Japanese Patent No. 4067509, a piston is disposed displaceably in a cylinder chamber, which is defined in the interior of a cylindrically shaped cylinder main body. In addition, a piston rod is inserted into a hole of the piston, and paired engagement rings are plastically deformed between an annular groove formed on an outer circumferential surface of the piston rod and an annular groove formed on an inner circumferential surface of the piston hole, whereby the piston and the piston rod are connected together mutually.

SUMMARY OF THE INVENTION

However, since coupling is performed through engagement of the engagement rings, it is necessary to machine an annular groove on the inner circumferential surface of the piston hole, and similarly, it is necessary to machine an annular groove on the outer circumferential surface of the piston rod, so that the number of manufacturing steps including machining of the grooves is increased, leading to a rise in manufacturing costs.

Further, with the aforementioned fluid pressure cylinder, the piston abuts against a wall surface of the cylinder main body at an end position where the piston is displaced, whereupon shocks are applied with respect to the piston. For buffering such shocks, ordinarily, shock absorbing means such as dampers or the like, which are capable of absorbing shocks, are disposed on both ends of the piston. However, in this case, the number of parts is increased due to the provision of the shock absorbing means, together with increasing the number of assembly steps.

On the other hand, a demand exists in the art to decrease material costs by reducing the weight of the piston, and to reduce the consumption amount of air that is supplied to the fluid pressure cylinder.

A general object of the present invention is to provide a coupling structure and a coupling method for a piston, for coupling a piston that is used in a fluid pressure cylinder, which is capable of absorbing loads applied in an axial direction to the piston, together with reducing weight and manufacturing costs for the fluid pressure cylinder along with a simple structure.

The present invention is characterized by a coupling structure for a piston used in a fluid pressure cylinder, the fluid pressure cylinder comprising a cylinder main body to which a pressure fluid is introduced to an interior thereof, a piston disposed displaceably in the interior of the cylinder main body, and a piston rod connected to the piston, the coupling structure being adapted to couple the piston with respect to the piston rod, wherein a hole is formed in a center portion of the piston, the hole extending in an axial direction with a diameter larger than an outside diameter of the piston rod, and between the piston and the piston rod, a coupling member, which is elastically deformable and is greater in diameter than the outside diameter of the piston rod, is provided for coupling the piston and the piston rod.

According to the present invention, a coupling member, which is elastically deformable and is larger in diameter than the outside diameter of the piston rod, is disposed between the piston and the piston rod, whereby the piston and the piston rod are connected by the coupling member. Accordingly, in a fluid pressure cylinder including the piston, for example, when the piston is displaced and comes into abutment against the cylinder main body at the displacement end position, shocks (loads) applied to the piston are absorbed suitably by elastic deformation of the coupling member, and transmission of such shocks to the piston rod can reliably be prevented.

As a result, for absorbing the aforementioned shocks, there is no need to provide a separate shock absorbing means for absorbing the shocks to the cylinder body or the piston, and with a simple structure including placement of the coupling member between the piston and the piston rod, the number of parts in the fluid pressure cylinder, manufacturing costs, and the number of assembly steps for manufacturing the fluid pressure cylinder can be reduced.

Further, compared to the conventional fluid pressure cylinder in which the outside diameter of the piston rod is substantially equivalent with an inside diameter of the hole, since the hole of the piston is formed with a greater diameter than the outside diameter of the piston rod, the piston can be made lighter in weight, while simultaneously, material costs can be reduced and the load weight of workpieces transported via the piston rod can be increased.

Next, with reference to the accompanying drawings, a preferred embodiment of the present invention will be described, and the aforementioned objects, along with other objects, characteristics and advantages of the present invention, will be made clear.

DESCRIPTION OF EMBODIMENTS

Figure 1:
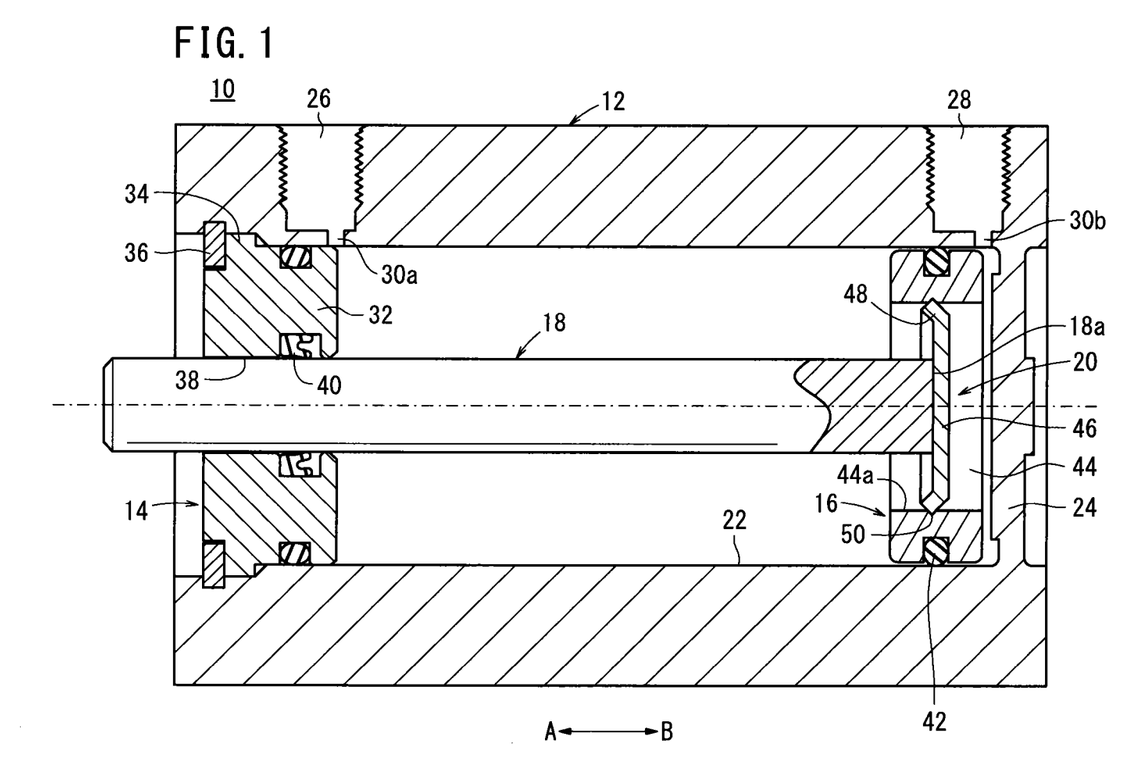
FIG. 1 is an overall cross sectional view of a fluid pressure cylinder to which a coupling structure and a coupling method for a piston according to an embodiment of the present invention are applied.

A preferred embodiment in relation to a coupling structure and a coupling method for a piston that is used in a fluid pressure cylinder according to the present invention will be described in detail below with reference to the accompanying drawings. In FIG. 1, reference numeral 10 indicates a fluid pressure cylinder to which the coupling structure for a piston according to the embodiment of the present invention is applied.

As shown in FIG. 1, the fluid pressure cylinder 10 includes a bottomed cylindrically shaped cylinder tube (cylinder main body) 12, a rod cover 14 installed on one end of the cylinder tube 12, a piston 16 disposed displaceably in the interior of the cylinder tube 12, a piston rod 18 connected to the piston 16 and which is supported displaceably in the rod cover 14, and a coupling body (coupling member) 20 that connects the piston 16 and the piston rod 18.

The cylinder tube 12 includes a cylinder hole 22 that extends in the axial direction (the directions of arrows A and B) in a center portion thereof. The cylinder hole 22 opens toward one end side (in the direction of the arrow A) of the cylinder tube 12. On the other hand, on the other end of the cylinder tube 12, a wall portion 24 is formed, which closes the cylinder hole 22.

Further, on an outside surface of the cylinder tube 12, a first port 26 and a second port 28 are formed through which a pressure fluid is supplied and discharged. The first port 26 is disposed in the vicinity of one end of the cylinder tube 12, whereas the second port 28 is disposed in the vicinity of the other end of the cylinder tube 12. Non-illustrated tubes are connected, respectively, through switching devices to the first port 26 and the second port 28. In addition, the first and second ports 26, 28 communicate with the cylinder hole 22 through communication passages 30a, 30b that extend to the side of the cylinder hole 22.

The rod cover 14 includes a small diameter portion 32, and a large diameter portion 34 disposed adjacent to the small diameter portion 32. The small diameter portion 32 is arranged on the side of the wall portion 24 in the cylinder tube 12 (in the direction of the arrow B). In addition, a stepped portion, which is formed between the small diameter portion 32 and the large diameter portion 34, is placed in engagement with a stepped portion formed on one end of the cylinder hole 22, and by mounting of a retaining ring 36 in an annular groove formed on an inner circumferential surface of the cylinder hole 22, the retaining ring 36 abuts against the end surface of the large diameter portion 34, whereby the rod cover 14 is fixed and positioned in the cylinder hole 22.

Further, in a center portion of the rod cover 14, a rod hole 38 is formed, which penetrates in the axial direction (the directions of arrows A and B), and the piston rod 18 is inserted through the rod hole 38. A rod packing 40 is installed via an annular groove, which is formed at a position on the inner circumferential side of the small diameter portion 32. The rod packing 40, for example, is formed in an annular shape from a resilient material such as rubber or the like, and by sliding contact against the outer circumferential surface of the piston rod 18, leakage of pressure fluid that passes to the exterior between the piston rod 18 and the rod cover 14 is prevented from occurring.

Figure 2:
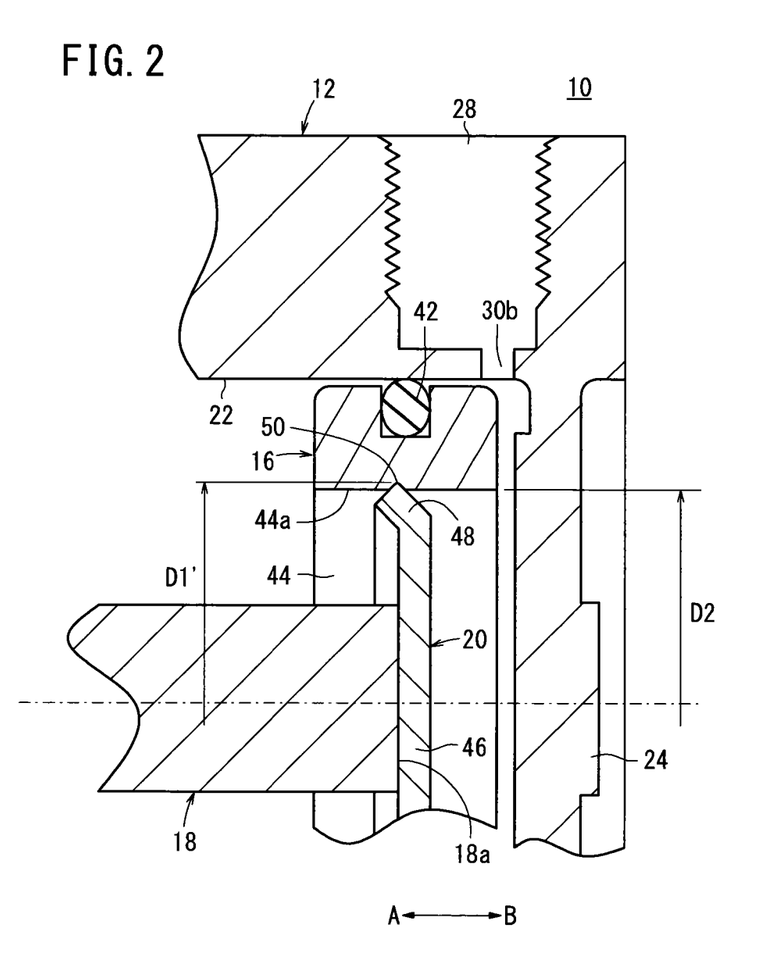
FIG. 2 is an enlarged cross sectional view showing a vicinity of the piston shown in FIG. 1.

As shown in FIGS. 1 and 2, the piston 16 is formed, for example, with a circular shape in cross section from a metal material such as aluminum or the like, and a piston packing 42 is installed through an annular groove on an outer circumferential surface thereof. In addition, by the piston packing 42 being in sliding contact with the inner circumferential surface of the cylinder hole 22, leakage of pressure fluid that flows between the piston 16 and the cylinder hole 22 is prevented from occurring.

Further, a piston hole (hole) 44 is formed that penetrates in the axial direction (the directions of arrows A and B) through the center of the piston 16. The piston hole 44 is formed with a substantially constant diameter along the axial direction. In addition, the coupling body 20 and one end 18a of the piston rod 18 are inserted in the piston hole 44.

The piston rod 18 is formed, for example, from a metal material such as stainless steel or the like with a predetermined length in the axial direction, and is formed with a substantially constant diameter along the axial direction. In addition, one end 18a of the piston rod 18 is formed in a planar shape perpendicular to the axial direction, and a later-described coupling body 20 is connected thereto and is inserted in the piston hole 44 of the piston 16. The other end of the piston rod 18 is inserted through the rod hole 38 of the rod cover 14, and is supported for displacement in the axial direction (the directions of arrows A and B).

The coupling body 20 is formed, for example, by press-molding a plate made from a metal material such as stainless steel or the like, and is constituted from a disk-shaped main body portion 46 and a bent portion (outer edge portion 48), which is inclined by bending an outer edge part of the main body portion 46 at a predetermined angle toward the axial direction (in the direction of the arrow A). The coupling body 20 is formed with a substantially constant width.

Stated otherwise, the bent portion 48 of the coupling body 20 is arranged on the side of the rod cover 14 (in the direction of the arrow A) in the cylinder main body 12.

The main body portion 46 is formed in a planar shape, and one side surface thereof is connected coaxially by welding or the like in a state of surface contact with respect to the one end 18a of the piston rod 18. In this case, the connection is made such that the bent portion 48 faces toward the side of the piston rod 18 (in the direction of the arrow A).

Figure 3A:
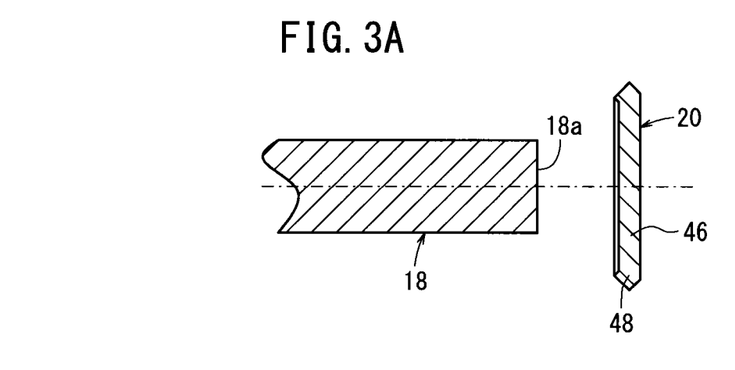
FIG. 3A is a cross sectional view showing a condition prior to connecting a coupling body to a piston rod.
Figure 3B:
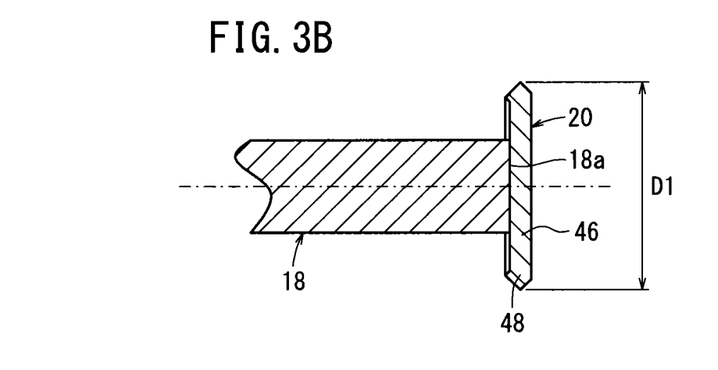
FIG. 3B is a cross sectional view showing a condition in which a coupling body is connected by welding to a piston rod.
Figure 3C:
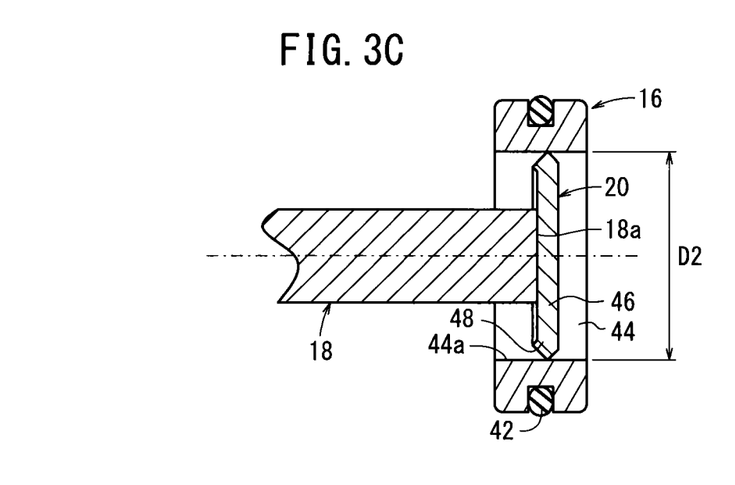
FIG. 3C is a cross sectional view showing a condition in which the coupling body shown in FIG. 3B and a portion of the piston rod are inserted into a piston hole of the piston.

Further, as shown in FIG. 3C, on the coupling body 20, the outside diameter D1 of the bent portion 48 is set to be slightly smaller than the inside diameter D2 of the piston hole 44 (D1<D2), and the hardness E1 of the coupling body 20, for example, is set to be greater than the hardness E2 of the piston 16 (E1>E2).

More specifically, when the coupling body 20 is installed in the piston hole 44 of the piston 16, and after the coupling body 20 has been inserted in the piston hole 44, the coupling body 20 is pressed in the axial direction (the direction of the arrow A) and the coupling body 20 is plastically deformed and expanded in diameter (refer to the outside diameter D1' in FIG. 3D), whereby an angled part 50 on an outer circumferential side that constitutes the bent portion 48 bites into and is fastened by caulking with respect to an inner circumferential surface 44a of the piston hole 44.

Furthermore, on the coupling body 20, the outer circumferential side of the main body portion 46 that is connected to the piston rod 18 and the bent portion 48 are elastically deformable in the axial direction (the directions of arrows A and B) of the coupling body 20.

The fluid pressure cylinder 10 to which the coupling structure for the piston 16 according to the embodiment of the present invention is applied is constructed basically as described above. Next, a case of connecting the piston 16 and the piston rod 18 will be described with reference to FIGS. 3A through 3D.

At first, from the condition shown in FIG. 3A, the main body portion 46 of the coupling body 20 is placed in abutment against the one end 18a of the piston rod 18, such that the bent portion 48 is oriented toward the side of the piston rod 18 (in the direction of the arrow A), and is arranged coaxially with the piston rod 18. In addition, heat is applied with respect to the main body portion 46 by a non-illustrated welding device, whereby a region in the vicinity of the abutment location between the main body portion 46 and the piston rod 18 is dissolved by high heat, and the main body portion 46 and the piston rod 18 are welded together mutually. Consequently, as shown in FIG. 3B, the coupling body 20 is fixed firmly to one end 18a of the piston rod 18.

Next, as shown in FIG. 3C, in a state in which the piston rod 18 is arranged coaxially with the piston hole 44 of the piston 16, the coupling body 20 is inserted into the interior of the piston hole 44 together with the piston rod 18, and the coupling body 20 is arranged substantially in the center along the axial direction of the piston hole 44, for example. In this case, since the outside diameter D1 of the coupling body 20 is formed to be slightly smaller than the inside diameter D2 of the piston hole 44 (D1<D2), the coupling body 20 can be inserted easily into the piston hole 44.

Figure 3D:
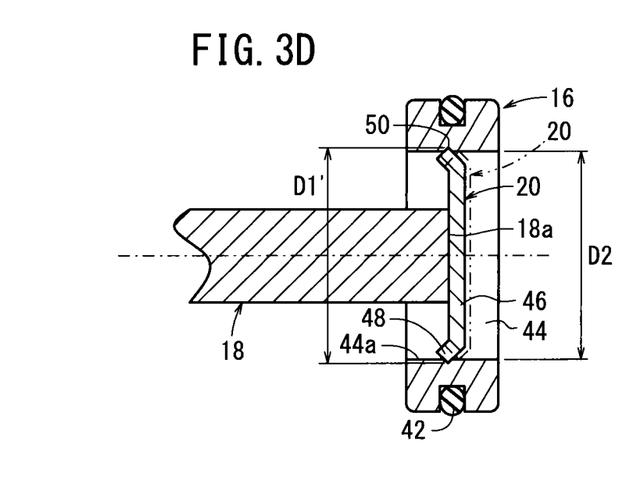
FIG. 3D is a cross sectional view showing a connected state of the piston and the piston rod, in which the coupling body is fastened by caulking with respect to the piston.

In addition, after the piston 16 and the piston rod 18 have been fixed by a non-illustrated jig or the like, the coupling body 20 is pressed by a caulking apparatus in the axial direction toward the side of the piston rod 18 (in the direction of the arrow A), and as shown in FIG. 3D, the coupling body 20 is plastically deformed so as to expand radially outward in diameter (refer to the outside diameter D1'). As a result, the bent portion 48 expands in diameter toward the outer circumferential side, and since the hardness of the coupling body 20 is greater than that of the piston 16, the angled part 50 on the outer circumferential side constituting the bent portion 48 bites into the inner circumferential surface 44a of the piston hole 44 (D1'>D2). Consequently, the coupling body 20 is fastened by caulking in the piston hole 44 of the piston 16.

More specifically, by fixing the coupling body 20 to the piston hole 44 of the piston 16, the piston 16 and the piston rod 18 connected to the coupling body 20 are connected reliably and firmly to each other. Further, since the bent portion 48 bites into the inner circumferential surface 44a of the piston hole 44, flow of pressure fluid between the piston hole 44 and the coupling body 20 is blocked.

Stated otherwise, the bent portion 48 of the coupling body 20 functions as a sealing means, which is capable of blocking flow of pressure fluid through the piston 16.

Moreover, the order in which the piston 16 and the piston rod 18 are connected is not limited to the above-described case. For example, the coupling body 20 may be caulked beforehand to the piston hole 44 of the piston 16, and thereafter, the piston rod 18 may be connected by welding with respect to the coupling body 20.

Further, welding of the coupling body 20 with respect to the piston rod 18 and fitting of the piston rod 18 including the coupling body 20 onto the piston 16 may be carried out substantially simultaneously. In this case, since the coupling body 20 is in a heated condition as a result of being resistance welded to the piston rod 18, when the coupling body 20 is caulked to the piston 16 by the non-illustrated caulking apparatus, such caulking can be carried out with a small pressing force, and thus the piston 16 and the piston rod 18 can be joined at a low cost using a small scale caulking apparatus.

Furthermore, since the piston 16 is connected by way of the coupling body 20 that is welded to the piston rod 18, even in the case that the piston 16 and the piston rod 18 are formed from different materials, the piston 16 and the piston rod 18 can be connected together reliably.

Next, operations and advantageous effects of the fluid pressure cylinder 10 in which the aforementioned piston 16 and piston rod 18 are connected will be described. The condition shown in FIG. 1, in which the piston 16 is displaced (in the direction of the arrow B) toward the side of the wall portion 24 of the cylinder tube 12, will be referred to as an initial position.

First, in the initial position, pressure fluid from a pressure fluid supply source (not shown) is introduced to the second port 28, and the pressure fluid is supplied through the communication passage 30b to the cylinder hole 22, whereupon the piston 16 is pressed and displaced toward the side of the rod cover 14 (in the direction of the arrow A) by the pressure fluid, which is supplied between the piston 16 and the wall portion 24. In this case, the first port 26 is in a state of being open to atmosphere.

Accordingly, the piston rod 18 is displaced together with the piston 16 in a direction (the direction of the arrow A) away from the wall portion 24, and gradually projects outwardly with respect to the rod cover 14 until the displacement end position is reached, at which the end surface of the piston 16 comes into abutment against the end surface of the rod cover 14.

At this time, shocks (loads) are applied to the piston 16 when the piston 16 abuts against the rod cover 14. The shocks applied to the piston 16 are absorbed by elastic deformation of parts of the main body portion 46 and the bent portion 48 of the coupling body 20 in a direction (the direction of the arrow B) away from the rod cover 14, about a joined location as a fulcrum point where the coupling body 20 joins with the piston rod 18. Owing thereto, shocks are prevented from being applied to the piston rod 18 from the piston 16. More specifically, simultaneously with serving to connect the piston 16 and the piston rod 18, the coupling body 20 functions as a damper, which is capable of preventing loads (shocks) applied to the piston 16 from being transmitted to the piston rod 18.

Next, in the case that the piston 16 is to be restored again to the initial position from the aforementioned displacement end position, the pressure fluid that had been supplied to the second port 28 is supplied instead to the first port 26 through operation of a non-illustrated switching device, and the pressure fluid is supplied through the communication passage 30a to the cylinder hole 22, whereupon the piston 16 is pressed gradually away from the rod cover 14 (in the direction of the arrow B) by the pressure fluid. In this case, the second port 28 is in a state of being open to atmosphere.

In addition, together with displacement of the piston 16, the piston rod 18 is displaced so as to become accommodated gradually in the interior of the rod cover 14, and the piston 16 abuts against the wall portion 24 in the cylinder tube 12, whereupon the initial position is restored upon stopping supply of the pressure fluid.

In this case as well, although shocks (loads) are applied to the piston 16 when the piston 16 abuts against the wall portion 24, since the shocks applied to the piston 16 are absorbed by elastic deformation of the bent portion 48 of the coupling body 20 toward the side of the rod cover 14 (in the direction of the arrow A), the shocks are prevented from being applied to the piston rod 18 from the piston 16.

In the foregoing manner, with the present embodiment, the bent portion 48 and the part of the main body portion 46 of the coupling body 20 that connect the piston 16 and the piston rod 18 are deformable elastically in the axial direction (the directions of arrows A and B). Therefore, when the piston 16 is displaced and comes into abutment against the rod cover 14 or the wall portion 24 of the cylinder main body 12, shocks (loads) applied to the piston 16 are absorbed suitably by elastic deformation of the bent portion 48 of the coupling body 20, and such shocks are prevented reliably from being transmitted to the piston rod 18.

More specifically, shocks applied to the piston 16 are prevented from being transmitted to another apparatus connected to the piston rod 18, or to a workpiece that is transported by the piston rod 18. As a result, the aforementioned shocks are absorbed, and it is unnecessary to provide a dedicated structure such as an air cushion or a damper on the cylinder main body 12, the piston 16, or the rod cover 14. Therefore, by means of a simple structure of disposing the coupling body 20 on the end of the piston rod 18, the number of parts, manufacturing costs, and the number of assembly steps for producing the fluid pressure cylinder in the fluid pressure cylinder 10 can be reduced.

Further, compared to a conventional fluid pressure cylinder, since the piston hole 44 formed in the center of the piston 16 can be formed with a greater diameter than the outside diameter of the piston rod 18, the piston 16 can be made lighter in weight, while at the same time, material costs can be reduced. As a result, accompanying the reduction in weight of the piston 16, the load weight of workpieces or the like transported by the piston rod 18 can be increased, together with enabling the piston 16 to be operated with less pressure fluid, and energy savings can be realized.

Furthermore, at the same time that the piston 16 and the piston rod 18 are connected by fitting the coupling body 20 in the piston hole 44 of the piston 16, sealing is carried out between the piston hole 44 and the coupling body 20, and thus an airtight condition can be maintained in the interior of the cylinder hole 22 without any need to provide a separate sealing member on the coupling body 20.

Still further, by carrying out welding of the coupling body 20 with respect to the piston rod 18 substantially simultaneously with connection of the piston rod 18 including the coupling body 20 to the piston 16, the coupling body 20, which has been heated for example by resistance welding, can be caulked with respect to the piston 16 with a small pressing force, and the piston 16 can be connected to the piston rod 18 at a low cost using a small scale caulking apparatus (not shown).

Still further, since connection of the coupling body 20 and the piston rod 18 is carried out by welding in a state of surface contact therebetween, and without providing mutual holes or the like in the coupling body 20 and the piston rod 18, there is no need to provide a sealing member between the coupling body 20 and the piston rod 18, and compared with the fluid pressure cylinder according to the conventional technique, in which a sealing member is provided, the number of parts and the number of assembly steps can be reduced. Furthermore, since it is unnecessary to provide an annular groove on the piston rod 18 for installation of a sealing member, the number of process steps can be reduced.

Further, since the piston 16 is connected via the coupling body 20, which is welded to the piston rod 18, and the piston 16 and the piston rod 18 are not welded directly to each other, it is possible for the piston 16 and the piston rod 18 to be formed from different materials.

In the above-described embodiment, a case has been described in which the bent portion 48 of the coupling body 20 is inclined with respect to the main body portion 46 (in the direction of the arrow A) toward the side of the piston rod 18. However, the present invention is not limited to this feature, and for example, in a condition of being connected to the piston rod 18, a coupling body 20 may be used in which the bent portion 48 thereof is inclined in a direction (the direction of the arrow B) away from the piston rod 18.

Next, fluid pressure cylinders 100, 106, 110, 130, 150, 170, to which coupling structures for pistons according to first through sixth modified examples are applied, will be described with reference to FIGS. 4 through 6. Constituent elements thereof, which are the same as those of the fluid pressure cylinder 10 to which the coupling structure for a piston 16 according to the aforementioned embodiment are applied, are denoted using the same reference numerals, and detailed description of such features is omitted.

Figure 4A:
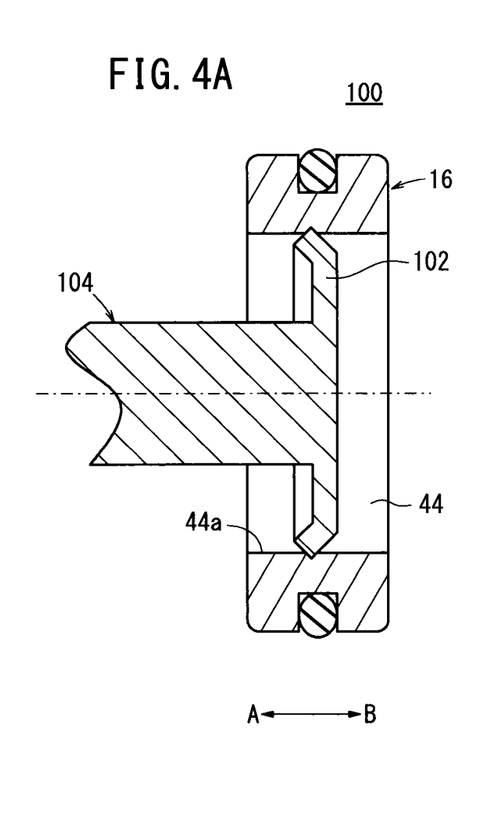
FIG. 4A is an enlarged cross sectional view showing a vicinity of the piston of a fluid pressure cylinder to which the coupling structure for a piston according to a first modified example is applied.

First, the coupling structure for a piston 16 according to the first modified example differs from the coupling structure for the piston 16 according to the aforementioned embodiment, in that, as in the fluid pressure cylinder 100 shown in FIG. 4A, instead of connecting the coupling body 20 to one end 18a of the piston rod 18, a flange (coupling member) 102, which is formed substantially in the same shape as the coupling body 20, is formed integrally on one end of a piston rod 104. The piston rod 104 having the flange 102 thereon is formed, for example, by a machining process such as cutting or the like.

In the foregoing manner, by providing the piston rod 104 having the flange 102, the process steps for welding the coupling body 20 and the piston rod 18 can be dispensed with, and since a welding apparatus also is unnecessary, manufacturing costs can be reduced. Stated otherwise, by applying the aforementioned coupling structure to the fluid pressure cylinder 100 having a small diameter piston 16, for example, in cases where the welding strength with respect to the coupling body is made smaller commensurate with reducing the diameter of the piston rod 104, by providing the flange 102, which corresponds to the coupling body, integrally with the piston rod 104, it is possible to reliably connect the piston 16 and the piston rod 104.

Figure 4B:
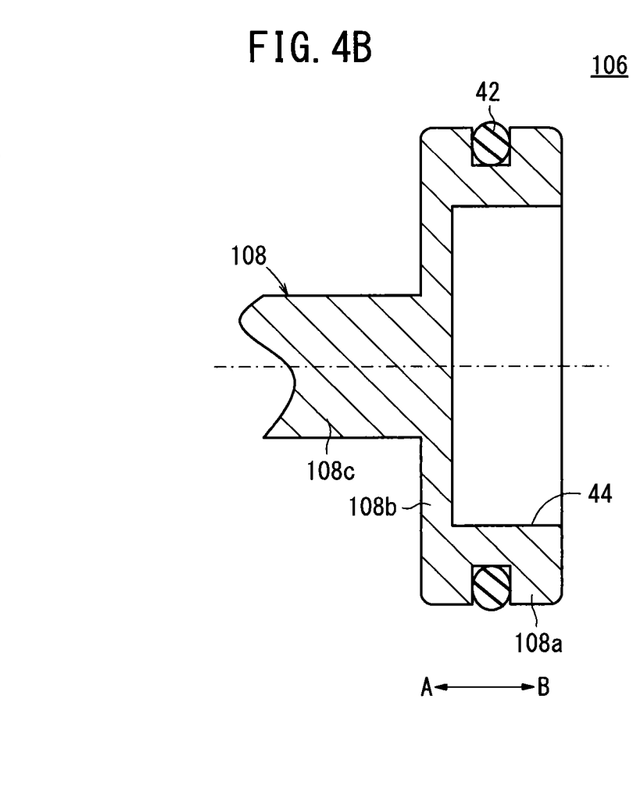
FIG. 4B is an enlarged cross sectional view showing a vicinity of the piston of a fluid pressure cylinder to which the coupling structure for a piston according to a second modified example is applied.

Further, with a coupling structure for a piston 16 according to a second modified example, as in the case of the fluid pressure cylinder 106 shown in FIG. 4B, a displaceable body 108 may be provided in which the piston 16, the piston rod 18, and the coupling body 20 are formed integrally.

The displaceable body 108 is made up from a piston section 108a having the piston hole 44 in the interior thereof, a coupling section 108b disposed on an end surface of the piston section 108a, and a piston rod section 108c connected to the center of the coupling section 108b. The piston rod section 108c extends in a direction (the direction of the arrow A) away from the piston section 108a.

In the foregoing manner, by providing the displaceable body 108, in which the piston section 108a having the piston hole 44, the coupling section 108b disposed on the end surface of the piston section 108a, and the piston rod section 108c connected to the center of the coupling section 108b are formed together integrally, and by disposing the displaceable body 108 displaceably in the interior of the cylinder tube 12, it is unnecessary for the piston and a flange portion of the piston rod to be connected by caulking or the like, as in the case of the fluid pressure cylinder 100 shown in FIG. 4A.

In this manner, for example, in the case that the outside diameter of the piston section 108a, which functions as a piston, is of a small diameter, together with making the displaceable body 108 lightweight, shocks that occur when the piston section 108a abuts against the cylinder tube 12 or the rod cover 14 can suitably be absorbed by the coupling section 108b.

Figure 5A:
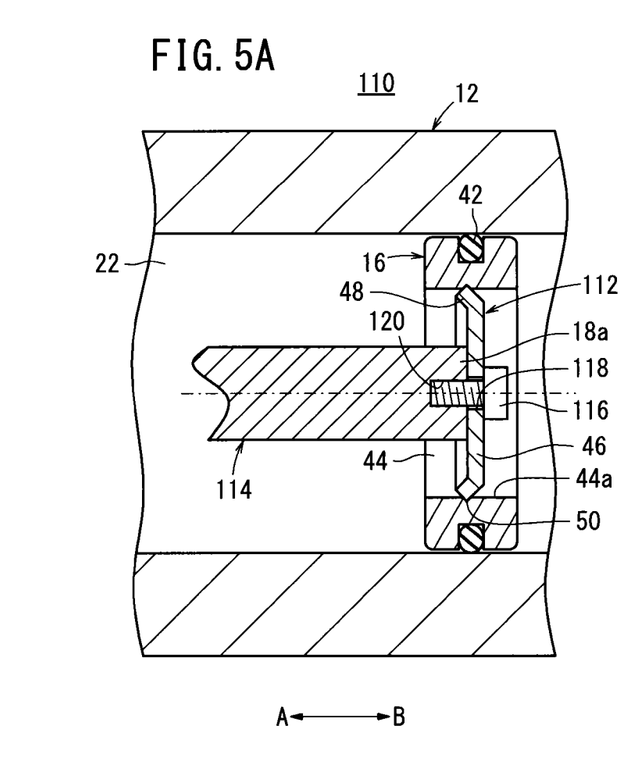
FIG. 5A is an enlarged cross sectional view showing a vicinity of the piston of a fluid pressure cylinder to which the coupling structure for a piston according to a third modified example is applied.

Next, a coupling structure for a piston 16 according to a third modified example differs from the coupling structure for a piston 16 according to the aforementioned embodiment, in that, as in the fluid pressure cylinder 110 shown in FIG. 5A, a coupling body 112 is connected by a bolt 116 with respect to one end 18a of a piston rod 114.

The bolt 116 is inserted through a hole 118 penetratingly provided substantially in the center of the coupling body 112. On the other hand, a bolt hole 120 with screw threads engraved on the inner circumferential surface thereof is formed in one end 18a of the piston rod 114, and the bolt 116, which is inserted through the hole of the coupling body 112, is screw-engaged with the bolt hole 120. Consequently, the main body portion 46 of the coupling body 112 abuts against the one end 18a of the piston rod 114, and is connected by the bolt 116 in a state of surface contact therewith.

In addition, after the coupling body 112 has been inserted in the piston hole 44 of the piston 16, the coupling body 112 is pressed by a non-illustrating caulking apparatus, and the coupling body 112 is plastically deformed and expanded in diameter in a radial outward direction, whereby the bent portion 48 of the coupling body 112 bites into the inner circumferential surface 44a of the piston hole 44. The coupling body 112 is now fastened by caulking to the piston hole 44 of the piston 16. Accordingly, without the piston 16 and the piston rod 18 being displaced relatively in the axial direction, the piston 16 and the piston rod 18 are connected together mutually through the coupling body 112.

Figure 5B:
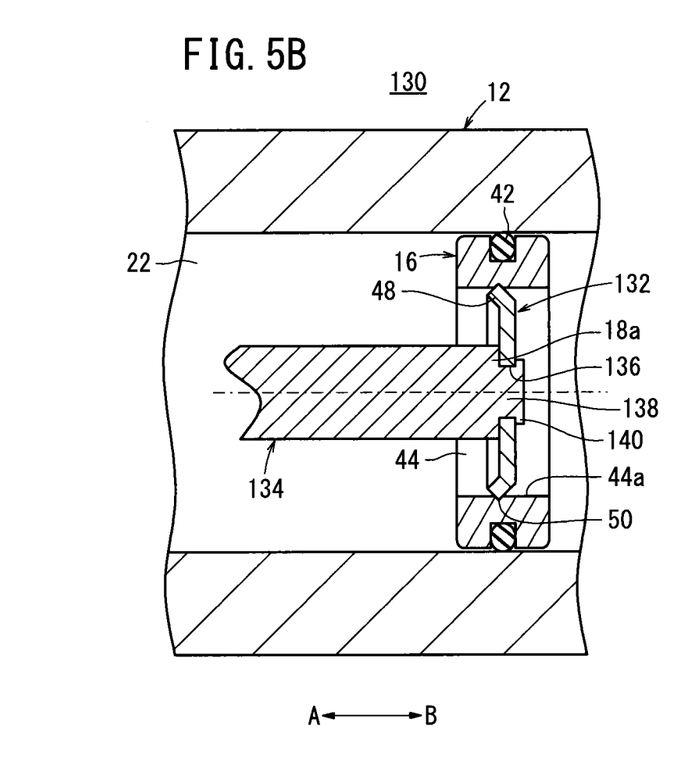
FIG. 5B is an enlarged cross sectional view showing a vicinity of the piston of a fluid pressure cylinder to which the coupling structure for a piston according to a fourth modified example is applied.

Next, a coupling structure for a piston 16 according to a fourth modified example differs from the coupling structure for a piston 16 according to the aforementioned embodiment, in that, as in the fluid pressure cylinder 130 shown in FIG. 5B, a coupling body 132 is connected by caulking with respect to one end 18a of a piston rod 134.

A projection 138 formed on one end 18a of the piston rod 134 is inserted through a hole 136 penetratingly provided substantially in the center of the coupling body 132. The projection 138 projects a predetermined height in the axial direction (the direction of the arrow B) with respect to one end 18a of the piston rod 134, and is formed with a slightly smaller diameter than the inside diameter of the hole 136.

In addition, the projection 138 is inserted through the hole 136 of the main body portion 46, and the main body portion 46 is placed in abutment against the one end 18a, such that the bent portion 48 of the coupling body 132 is oriented toward the side of the piston rod 134 (in the direction of the arrow A).

Next, the distal end of the projection 138 that projects with respect to the main body portion 46 is pressed and is deformed plastically by a non-illustrated caulking apparatus, so that the projection 138 is expanded in diameter in a radial outward direction, thereby forming a caulked portion 140. Consequently, the main body portion 46 of the coupling body 132 is sandwiched and fixed between one end 18a of the piston rod 134 and the diametrically expanded caulked portion 140.

Lastly, after the coupling body 132 has been inserted in the piston hole 44 of the piston 16, the coupling body 132 is pressed by a non-illustrated caulking apparatus, and the coupling body 132 is plastically deformed and expanded in diameter in a radial outward direction, whereby the bent portion 48 of the coupling body 132 bites into the inner circumferential surface 44a of the piston hole 44, and the coupling body 132 is fastened by caulking to the piston hole 44 of the piston 16. Accordingly, without the piston 16 and the piston rod 18 being displaced relatively in the axial direction, the piston 16 and the piston rod 18 are connected together mutually through the coupling body 132.

More specifically, by the coupling body 112, 132 being inserted and fastened by caulking with respect to the piston hole 44 of the piston 16, for example, even in the case that a space cannot be assured for fixing a piston with respect to the piston rod 18 by a screw connection or a retaining ring or the like, the above-described coupling structure for the piston 16 is capable of reliably connecting the piston 16 and the piston rod 18.

Figure 6A:
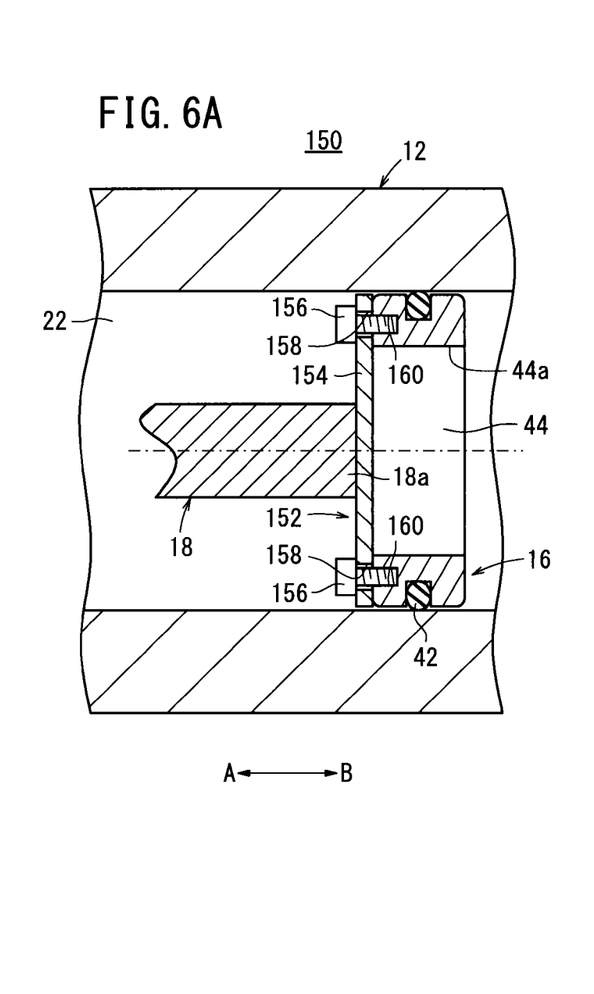
FIG. 6A is an enlarged cross sectional view showing a vicinity of the piston of a fluid pressure cylinder to which the coupling structure for a piston according to a fifth modified example is applied.

Next, a coupling structure for a piston 16 according to a fifth modified example differs from the coupling structure for a piston 16 according to the aforementioned embodiment, in that, as in the fluid pressure cylinder 150 shown in FIG. 6A, a coupling body 152 does not have a bent portion, but is formed only from a planar shaped main body portion 154, and the coupling body 152 is connected by a plurality of bolts 156 with respect to an end surface of the piston 16.

A center portion of the coupling body 152 is connected by welding or the like with respect to the one end 18a of the piston rod 18, and on an outer circumferential side thereof, the coupling body 152 includes a plurality of holes 158 that penetrate therethrough in the axial direction (the directions of arrows A and B). Bolts 156 are inserted through the holes 158 and are screw-engaged, respectively, in bolt holes 160 that are formed on an end surface of the piston 16. Accordingly, the coupling body 152 abuts with respect to the end surface of the piston 16, and is fixed by the plural bolts 156 in a state of surface contact therewith. As a result, the piston 16 and the piston rod 18 are joined to one another without relative displacement thereof in the axial direction (the directions of arrows A and B).

The holes 158 and the bolt holes 160 are provided at substantially equal intervals mutually in the circumferential direction of the coupling body 152 and the piston 16.

Further, in the case that shocks (loads) are applied in the axial direction with respect to the piston 16, after such loads have been transmitted to the coupling body 152 from the piston 16, the outer circumferential region thereof is flexed, so as to become deformed elastically with respect to the center portion connected to the piston rod 18. Consequently, since shocks applied to the piston 16 are absorbed suitably by the coupling body 152, the shocks are prevented from being transmitted to the piston rod 18.

Figure 6B:
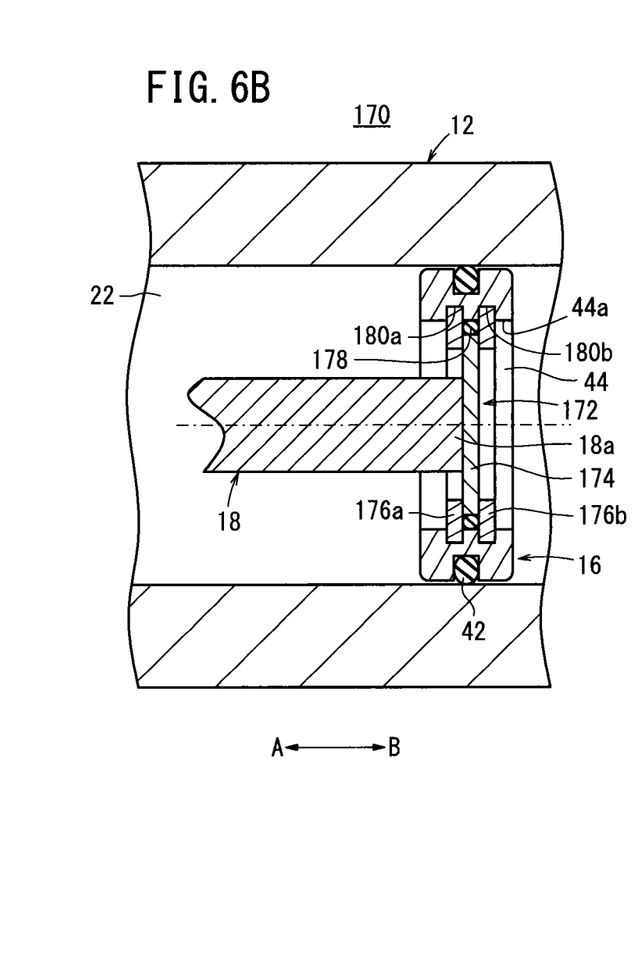
FIG. 6B is an enlarged cross sectional view showing a vicinity of the piston of a fluid pressure cylinder to which the coupling structure for a piston according to a sixth modified example is applied.

Next, a coupling structure for a piston 16 according to a sixth modified example differs from the coupling structure for the piston 16 according to the aforementioned embodiment, in that, as in the fluid pressure cylinder 170 shown in FIG. 6B, a coupling body 172 does not have a bent portion, but is formed only from a planar shaped main body portion 174, and the coupling body 172 is inserted in the piston hole 44 of the piston 16 and fixed by a pair of retaining rings 176a, 176b.

The outside diameter of the coupling body 172 is substantially the same or slightly smaller than the inside diameter of the piston hole 44 of the piston 16, and the center of the coupling body 172 is connected by welding with respect to one end 18a of the piston rod 18. Further, an O-ring 178 is installed via an annular groove on the outer circumferential surface of the coupling body 172, such that when the coupling body 172 is inserted in the piston hole 44, the O-ring 178 abuts against the inner circumferential surface 44a of the piston hole 44.

A pair of ring grooves 180a, 180b is formed in the piston hole 44, the ring grooves 180a, 180b being separated mutually in the axial direction (the directions of arrows A and B) from a substantially central portion where the coupling body 172 is inserted. Additionally, in a state in which the coupling body 172 is inserted in the piston hole 44 and is disposed between one of the ring grooves 180a and the other of the ring grooves 180b, C-shaped retaining rings 176a, 176b are inserted respectively from the one opening and the other opening in the piston hole 44, and are positioned respectively in engagement with the ring grooves 180a, 180b.

When placed in engagement with the ring grooves 180a, 180b, since the retaining rings 176a, 176b are installed so as to project circumferentially inward with respect to the inner circumferential surface 44a of the piston hole 44, the coupling body 172 is retained between the retaining rings 176a, 176b. As a result, along with the coupling body 172 being held in the piston hole 44 of the piston 16, the piston 16 and the piston rod 18 are connected together mutually without relative displacement thereof in the axial direction.

Further, in the case that shocks (loads) are applied in the axial direction with respect to the piston 16, after such loads have been transmitted to the retaining rings 176a (176b) from the piston 16, the coupling body 172 is pressed by the retaining rings 176a (176b) and the outer circumferential region of the coupling body 172 is flexed, so as to become deformed elastically with respect to the center portion connected to the piston rod 18. Consequently, since shocks applied to the piston 16 are absorbed suitably by the coupling body 172, the shocks are prevented from being transmitted to the piston rod 18.

In the fluid pressure cylinders 150, 170, for example, in the event that a large diameter piston 16 is used, since the coupling bodies 152, 172 are not fastened by caulking with respect to the piston 16, but instead can be connected reliably using the bolts 156 or the retaining rings 176a, 176b, it is unnecessary to carry out caulking of the coupling bodies 152, 172 at an excessive load with respect to the large diameter piston 16, it further is unnecessary to prepare a large scale caulking apparatus to perform such caulking, and manufacturing costs including investment in equipment can be suppressed.

Figure 7A:
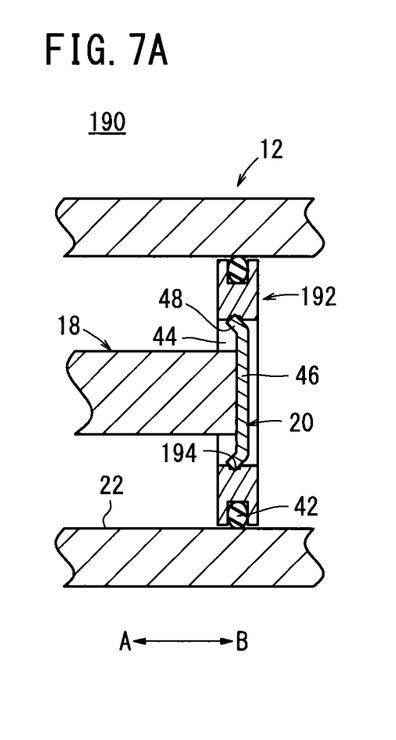
FIG. 7A is an enlarged cross sectional view showing a vicinity of the piston of a fluid pressure cylinder to which the coupling structure for a piston according to a seventh modified example is applied.
Figure 7B:
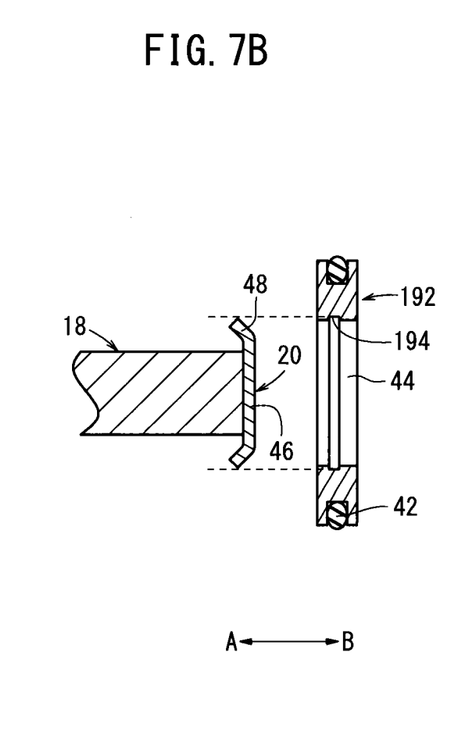
FIG. 7B is an exploded cross sectional view of the piston and the coupling body of FIG. 7A.

Next, a coupling structure for a piston 192 according to a seventh modified example differs from the coupling structure for a piston 16 according to the aforementioned embodiment, in that, as in a fluid pressure cylinder 190 shown in FIGS. 7A and 7B, an annular groove 194 is formed on the inner circumferential surface of the piston hole 44 in the piston 192, and the coupling body 20 connected to the piston rod 18 is engaged with respect to the annular groove 194.

The annular groove 194, for example, is formed substantially centrally along the axial direction (the directions of arrows A and B) of the piston 192, and is formed at a constant depth along the inner circumferential surface of the piston hole 44.

In addition, as shown in FIG. 7B, when the coupling body 20, which is mounted on the end of the piston rod 18, is installed in the piston hole 44 of the piston 192, after the coupling body 20 has been inserted in the piston hole 44, the coupling body 20 is pressed in the axial direction (in the direction of the arrow A) and is plastically deformed in a radial outward direction and expanded in diameter, whereby the angled part 50 on the outer circumferential side constituting the bent portion 48 is inserted into the annular groove 194 of the piston hole 44 in engagement therewith.

Consequently, the piston rod 18 is connected coaxially with the piston 192 through the coupling body 20. Further, as noted above, the invention is not limited to a case in which the coupling body 20 and the piston 192 are connected to each other beforehand, but for example, after the coupling body 20 has been installed with respect to the piston rod 18, the end of the piston rod 18 may be connected by welding or the like with respect to the main body portion 46 of the coupling body 20.

In the foregoing manner, by providing the annular groove 194 on the inner circumferential surface of the piston hole 44, and causing the coupling body 20 to expand in diameter with respect to the annular groove 194 and be placed in engagement therewith, the coupling body 20 can easily and reliably be installed with respect to the piston 192, along with enabling connection of the piston 192 and the piston rod 18, which is connected to the coupling body 20.

Further, for example, when the piston 192 abuts against the rod cover 14, although shocks (loads) are applied to the piston 192 in a direction (the direction of the arrow B) away from the rod cover 14, the shocks applied to the piston 192 are absorbed by elastic deformation of parts of the main body portion 46 and the bent portion 48 of the coupling body 20 in a direction (the direction of the arrow B) away from the rod cover 14 about a joined location as a fulcrum point where the coupling body 20 joins with the piston rod 18.

On the other hand, although shocks (loads) also are applied when the piston 192 abuts against the wall portion 24 of the cylinder tube 12, the shocks applied to the piston 192 are absorbed by elastic deformation of parts of the main body portion 46 and the bent portion 48 of the coupling body 20 in a direction (the direction of the arrow A) away from the wall portion 24 about the joined location as a fulcrum point where the coupling body 20 joins with the piston rod 18. Together therewith, by the bent portion 48 being secured in engagement with the annular groove 194, the coupling body 20 is reliably prevented from being pulled out with respect to the piston 192.

Owing thereto, shocks that are applied in the axial direction (the directions of arrows A and B) with respect to the piston 192 are suitably absorbed by the coupling body 20 and are prevented from being applied to the piston rod 18 from the piston 192. Additionally, by engagement of the coupling body 20 with respect to the annular groove 194, the coupling body 20 and the piston rod 18 can be connected more securely with respect to the piston 192.

Figure 7C:
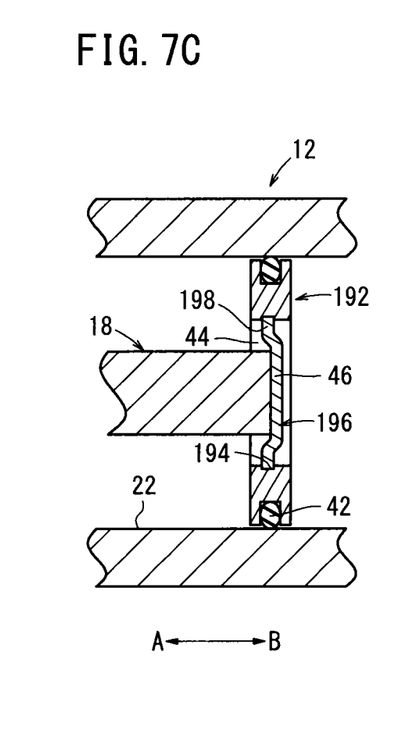
FIG. 7C is an enlarged cross sectional view showing a modification of the coupling structure of FIG. 7A.

Further, as in the coupling structure shown in FIG. 7C, the piston 192 and the piston rod 18 may be connected using a coupling body 196, in which a bent portion 198 is formed substantially in parallel with the main body portion 46 and is offset therefrom in the axial direction (the direction of the arrow A). In the coupling body 196, the bent portion 198 is offset with respect to the main body portion 46 by a predetermined distance substantially in parallel toward the side of the piston rod 18 (in the direction of the arrow A), and extends in a radial outward direction perpendicularly to the axis of the piston rod 18.

In addition, after the coupling body 196 has been inserted in the piston hole 44 of the piston 192, by pressing the coupling body 196 in the axial direction (the direction of the arrow A) to cause plastic deformation and diametric expansion thereof in a radial outward direction, the distal end of the bent portion 198 is brought into engagement with respect to the annular groove 194. Consequently, compared to the coupling structure for the piston 192 according to the seventh modification, since the bent portion 198 can be inserted on a straight line with respect to the annular groove 194, a large region of contact between the bent portion 198 and the annular groove 194 can be assured. As a result, leakage of pressure fluid between the piston 192 and the coupling body 196 can be prevented more reliably, and sealability can be improved.

Figure 8A:
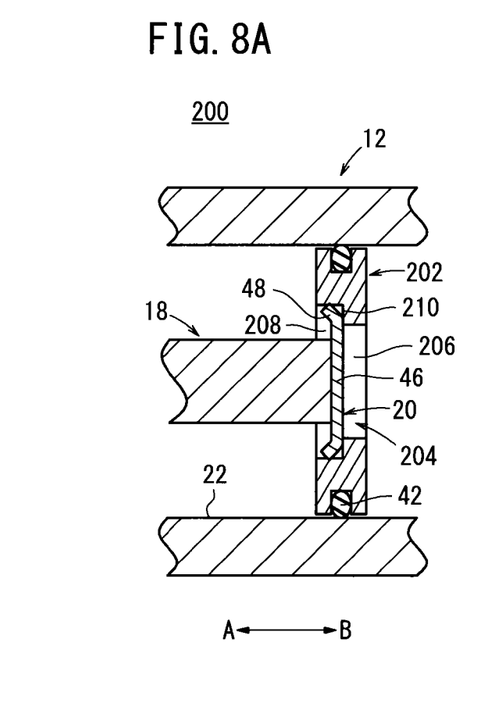
FIG. 8A is an enlarged cross sectional view showing a vicinity of the piston of a fluid pressure cylinder to which the coupling structure for a piston according to an eighth modified example is applied.
Figure 8B:
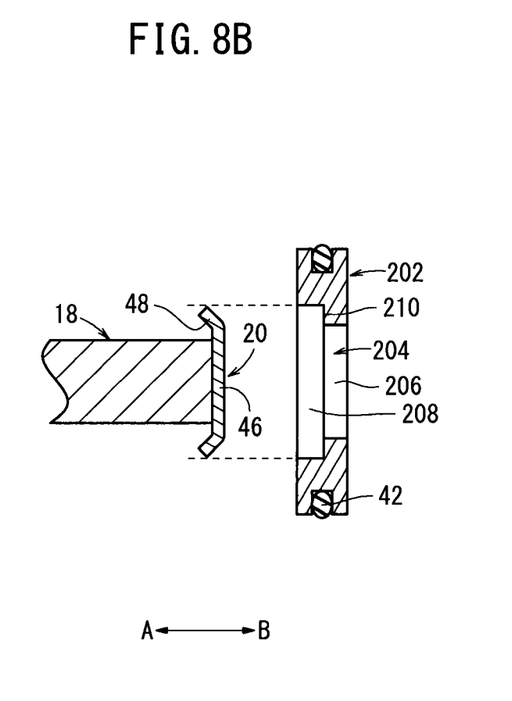
FIG. 8B is an exploded cross sectional view of the piston and the coupling body of FIG. 8A.

Next, a coupling structure according to an eighth modified example differs from the coupling structure for a piston 16 according to the aforementioned embodiment, in that, as in a fluid pressure cylinder 200 shown in FIGS. 8A and 8B, a piston hole 204 for a piston 202 is constituted from first and second hole sections 206, 208 having different inside diameters, and the coupling body 20 is installed with respect to the second hole section 208, which is formed with a larger diameter.

In the piston hole 204, the small diameter first hole section 206 is formed on one end side (in the direction of the arrow B) of the piston 202 in which the piston rod 18 is inserted, and the second hole section 208, which is larger in diameter than the first hole section 206, is formed on the other end side (in the direction of the arrow A) of the piston 202.

In addition, in a state in which the coupling body 20 is inserted in the second hole section 208 and abuts against a boundary region 210 between the first hole section 206 and the second hole section 208, the coupling body 20 is pressed in the axial direction (the direction of the arrow A) and is plastically deformed in a radial outward direction so as to expand in diameter, whereby the distal end of the bent portion 48 is brought into engagement with respect to the inner circumferential surface of the second hole section 208.

Figure 8C:
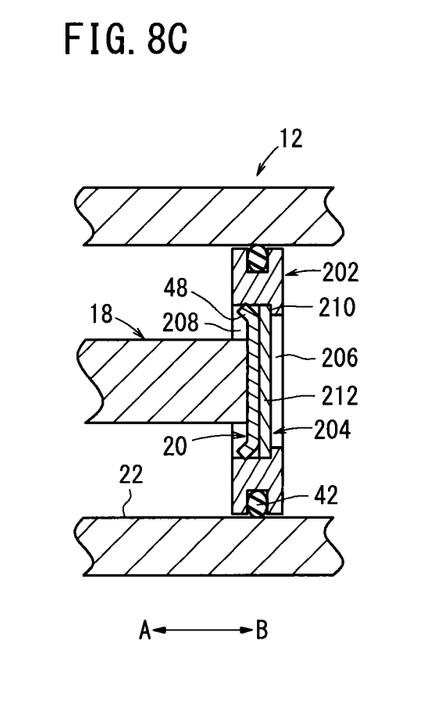
FIG. 8C is an enlarged cross sectional view showing a modification of the coupling structure of FIG. 8A.

Further, as shown in FIG. 8C, a disk shaped plate body 212 may be inserted together with the coupling body 20 with respect to the second hole section 208 of the piston, such that the plate body 212 is arranged on the side of the first hole section 206 (in the direction of the arrow B). In addition, in a state in which the plate body 212 is placed in abutment against the boundary region 210 between the first hole section 206 and the second hole section 208, the coupling body 20 is pressed (in the direction of the arrow A) and is plastically deformed in a radial outward direction so as to expand in diameter, whereby the distal end of the bent portion 48 is brought into engagement with respect to the inner circumferential surface of the second hole section 208, and hence, the coupling body 20 is connected with respect to the second hole section 208, together with the plate body 212 being gripped between the coupling body 20 and the boundary region 210.

Consequently, when the piston 202 abuts against the rod cover 14, although shocks (loads) are applied to the piston 202 in a direction (the direction of the arrow B) away from the rod cover 14, the shocks applied to the piston 202 are absorbed by elastic deformation of parts of the main body portion 46 and the bent portion 48 of the coupling body 20 in the direction (the direction of the arrow B) away from the rod cover 14 about the joined region as a fulcrum point where the coupling body 20 joins with the piston rod 18.

Further, although shocks (loads) also are applied when the piston 202 abuts against the wall portion 24 of the cylinder tube 12, the shocks applied to the piston 202 are absorbed by elastic deformation of parts of the main body portion 46 and the bent portion 48 of the coupling body 20 in a direction (the direction of the arrow A) away from the wall portion 24 about the joined location as a fulcrum point where the coupling body 20 joins with the piston rod 18. Together therewith, by abutment of the coupling body 20 against the boundary region 210 between the first hole section 206 and the second hole section 208, the coupling body 20 is reliably prevented from being pulled out from the piston hole 204.

Further, as shown in FIG. 8C, by providing the plate body 212 on a side opposite from the direction in which the piston rod 18 connected to the coupling body 20 extends, even in the event that loads are applied with respect to the piston 202 toward the side of the piston rod 18, the coupling body can be prevented assuredly from falling out from the piston hole 204 by the plate body 212. Stated otherwise, the plate body 212 includes the function of a pull out preventative means, which is capable of preventing falling out of the coupling body 20 in the piston hole 204.

Figure 9A:
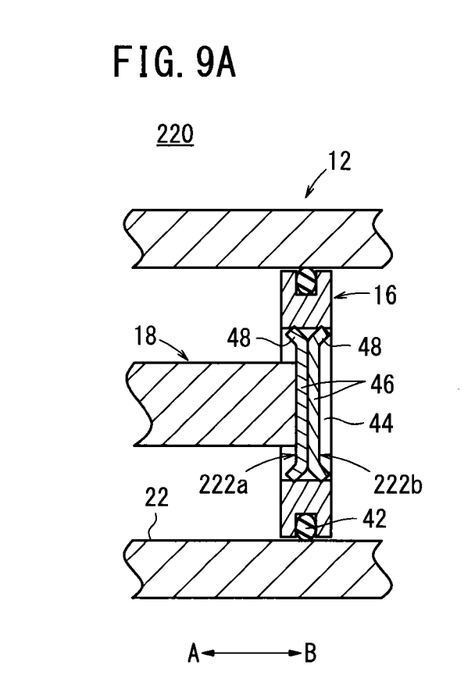
FIG. 9A is an enlarged cross sectional view showing a vicinity of the piston of a fluid pressure cylinder to which the coupling structure for a piston according to a ninth modified example is applied.
Figure 9B:
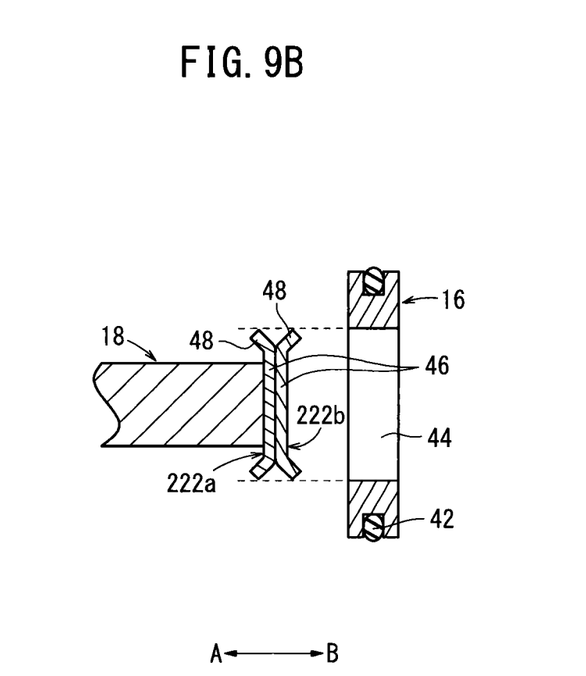
FIG. 9B is an exploded cross sectional view of the piston and the coupling body of FIG. 9A.

Next, a coupling structure according to a ninth modified example differs from the coupling structure for a piston 16 according to the aforementioned embodiment, in that, as in a fluid pressure cylinder 220 shown in FIGS. 9A and 9B, a pair of first and second coupling bodies 222a, 222b is connected to the end of the piston rod 18, where the first and second coupling bodies 222a, 222b are engaged with respect to the piston hole 44.

In the case of the first coupling body 222a, the bent portion 48 thereof is arranged in the piston hole 44 so as to be oriented toward one end side of the piston 16 (in the direction of the arrow A), whereas in the case of the second coupling body 222b, the bent portion 48 thereof is arranged in the piston hole 44 so as to be oriented toward the other end side of the piston 16 (in the direction of the arrow B). Further, the main body portions 46 of the first and second coupling bodies 222a, 222b are disposed in mutually abutting relation to each other, with the end of the piston rod 18 being connected to the main body portion 46 of the first coupling body 222a.

Furthermore, in a state in which the first and second coupling bodies 222a, 222b are arranged in the piston hole 44, the first and second coupling bodies 222a, 222b are pressed in the axial direction (the direction of the arrow A) and are plastically deformed and expanded radially outward in diameter, whereby the distal ends of the bent portions 48 are brought into engagement, respectively, with respect to the inner circumferential surface of the piston hole 44, and the first and second coupling bodies 222a, 222b are connected with respect to the piston 16.

At this time, concerning the first coupling body 222a, since the bent portion 48 thereof is engaged while being bent toward the side of one end of the piston 16 (in the direction of the arrow A), for example, when loads are applied to the piston 16 that are directed toward the side of the piston rod 18 (in the direction of the arrow A), a firm connection is established by the bent portion 48, which bites in deeply with respect to the inner circumferential surface of the piston hole 44, and together therewith, the loads are absorbed and are prevented from being transmitted to the piston rod 18.

Further, concerning the second coupling body 222b, since the bent portion 48 thereof is engaged while being bent toward the opposite end side of the piston 16 (in the direction of the arrow B), for example, when loads are applied to the piston 16 that are directed away from the piston rod 18, a firm connection is established by the bent portion 48, which bites in deeply with respect to the inner circumferential surface of the piston hole 44, and together therewith, the loads are absorbed and are prevented from being transmitted to the piston rod 18.

More specifically, the coupling structure for the piston 16 according to the above ninth embodiment includes the first and second coupling bodies 222a, 222b, which are arranged symmetrically with respect to the mutually abutting main body portions 46, and by connecting the first and second coupling bodies 222a, 222b in the piston hole 44 of the piston 16, even in the case that loads are applied respectively to the piston 16 at the side of the rod cover 14 and at the side of the wall portion 24 of the cylinder tube 12, such loads can be suitably absorbed, respectively, by the first and second coupling bodies 222a, 222b and can be prevented from being transmitted to the piston rod 18.

Figure 9C:
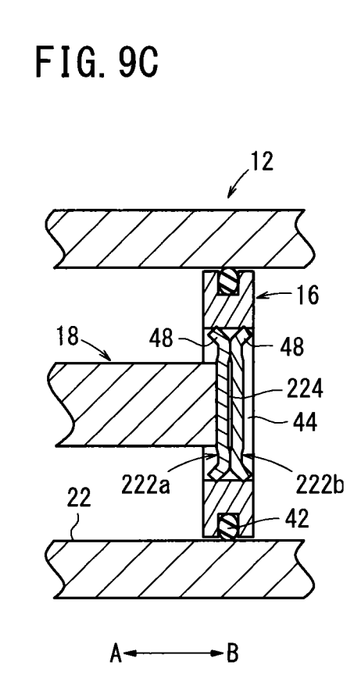
FIG. 9C is an enlarged cross sectional view showing a modification of the coupling structure of FIG. 9A.

Further, as shown in FIG. 9C, a gap 224 may be disposed between the first coupling body 222a and the second coupling body 222b. The gap 224 is disposed between the main body portion 46 of the first coupling body 222a and the main body portion 46 of the second coupling body 222b, and is constructed such that mutually confronting end surfaces of the main body portions 46 are recessed at predetermined depths. By means of such a structure, when loads are applied in the axial direction with respect to the piston 16 and the first and second coupling bodies 222a, 222b are deformed, since the deformation can be made greater by using the gap 224, such loads can be prevented from being transmitted from the piston 16 to the piston rod 18, and shocks can be mitigated more suitably, compared with the structure of the piston 16 according to the ninth embodiment.

Figure 10A:
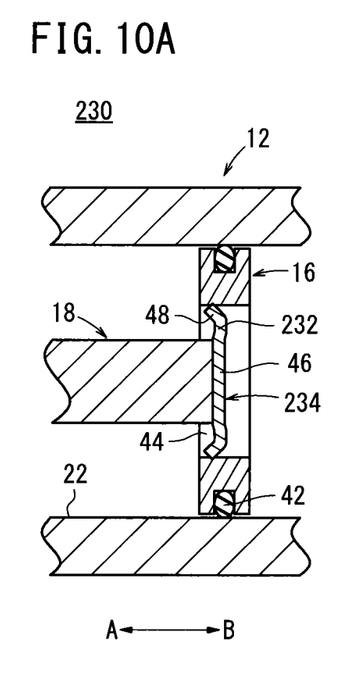
FIG. 10A is an enlarged cross sectional view showing a vicinity of the piston of a fluid pressure cylinder to which the coupling structure for a piston according to a tenth modified example is applied.
Figure 10B:
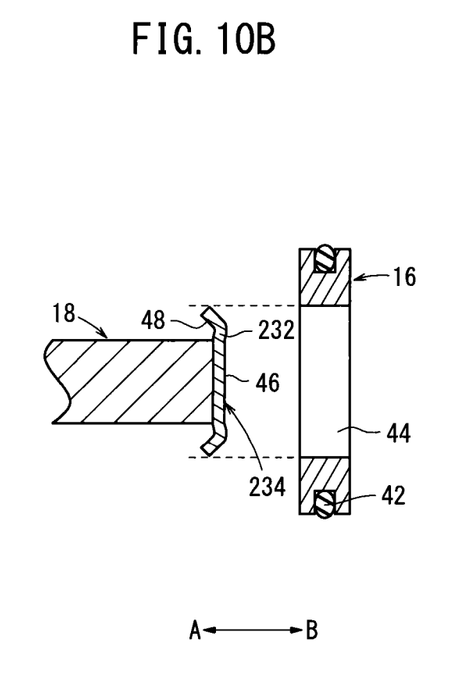
FIG. 10B is an exploded cross sectional view of the piston and the coupling body of FIG. 10A.

Next, a coupling structure according to a tenth modified example differs from the coupling structure for a piston 16 according to the aforementioned embodiment, in that, as in a fluid pressure cylinder 230 shown in FIGS. 10A and 10B, the piston 16 and the piston rod 18 are connected by using a coupling body 234 having a curved portion 232, which is curved between the bent portion 48 and the main body portion 46.

The coupling body 234 includes the curved portion 232 on the outer edge part of the main body portion 46, which is formed in a planar shape, and the curved portion 232 is formed with an arcuate shape in cross section bulging in an opposite direction to the direction in which the bent portion 48 is bent. Stated otherwise, the coupling body 234 is formed with a wavy or undulating shape in cross section from the main body portion 46, the curved portion 232, and the bent portion 48.

In accordance with such a structure, when loads are applied in the axial direction with respect to the piston 16 and the coupling body 234 is deformed, by means of the curved portion 232, such loads can be suitably absorbed, and therefore, transmission of the loads from the piston 16 to the piston rod 18 can be prevented, and shocks can be absorbed more effectively.

More specifically, connection of the pistons 16, 192, 202 and the piston rods 18, 104, 114, 134 may be accomplished by selecting and adopting an optimum structure from among the coupling structure for a piston according to the aforementioned present embodiment, and the coupling structures for pistons according to the first through eleventh modified examples.

While the coupling structure and the coupling method for a piston used in a fluid pressure cylinder according to the present invention have been described above, the present invention is not limited to the above-described embodiments. It is a matter of course that various additional or alternative features could be adopted therein without departing from the scope and gist of the present invention.

The invention claimed is:

1. A coupling structure for a piston used in a fluid pressure cylinder, comprising:
   a coupling member, wherein
   the fluid pressure cylinder includes a cylinder main body to which a pressure fluid is introduced to an interior thereof, the piston disposed displaceably in the interior of the cylinder main body, and a piston rod connected to the piston, the coupling structure being adapted to couple the piston with respect to the piston rod,
   a hole is formed in a center portion of the piston, the hole extending in an axial direction with a diameter larger than an outside diameter of the piston rod, and between the piston and the piston rod, the coupling member, which is elastically deformable and is greater in diameter than the outside diameter of the piston rod, bites into an inner circumferential surface of the hole and is provided to couple the piston and the piston rod, and the coupling member is connected with respect to an end of the piston rod.

2. The coupling structure according to claim 1, wherein the coupling member further includes:
   a main body portion in contact with and connected to the end of the piston rod; and
   an outer edge portion formed on an outer circumferential side of the main body portion and connected to the piston.

3. The coupling structure according to claim 2, wherein the coupling member is inserted into the hole of the piston, and the outer edge portion thereof is fastened by caulking with respect to the inner circumferential surface of the hole.

4. The coupling structure according to claim 3, wherein the outer edge portion is inclined toward an axial direction of the piston and the piston rod with respect to the main body portion.

5. The coupling structure according to claim 2, wherein the outer edge portion is inclined toward an axial direction of the piston and the piston rod with respect to the main body portion.

6. The coupling structure according to claim 2, wherein the coupling member includes a curved portion, which is curved in the axial direction, disposed between the main body portion and the outer edge portion.

7. The coupling structure according to claim 1, wherein the coupling member is fastened by caulking with respect to a caulked portion disposed on the end of the piston rod.

8. The coupling structure according to claim 1, wherein an annular groove is formed along the inner circumferential surface in the hole of the piston, the coupling member being adapted to engage with respect to the annular groove.

9. The coupling structure according to claim 1, wherein a hole that penetrates in the axial direction is formed in the piston, the hole including a large diameter first hole section formed on a side of the piston rod, and a small diameter second hole section adjacent to and smaller in diameter than the first hole section, the coupling member being connected with respect to the first hole section.

10. The coupling structure according to claim 1, wherein the coupling member is disposed as a pair with respect to the piston, an outer edge portion of one of the coupling members and an outer edge portion of another of the coupling members being inclined mutually in directions away from each other in the axial direction of the piston.

11. The coupling structure according to claim 10, wherein a gap having a predetermined interval of separation in the axial direction of the piston is disposed between the one of the coupling members and the other of the coupling members.

12. The coupling structure according to claim 1, wherein the coupling member is connected by welding with respect to the end of the piston rod.

13. The coupling structure according to claim 1, wherein the coupling member includes a hardness that is greater than a hardness of the piston.

14. The coupling structure according to claim 1, wherein the coupling member is made of a metal material.

15. A coupling method for a piston used in a fluid pressure cylinder, the fluid pressure cylinder including a cylinder main body to which a pressure fluid is introduced to an interior thereof, the piston disposed displaceably in the interior of the cylinder main body, and a piston rod connected to the piston, the coupling method being adapted to couple the piston with respect to the piston rod, the coupling method comprising:
 connecting a coupling member, which is elastically deformable and is greater in diameter than an outside diameter of the piston rod, to an end of the piston rod;
 inserting the coupling member through a hole of the piston; and
 pressing the coupling member in an axial direction to expand the coupling member in diameter in a radial direction while in the hole, thereby causing an outer edge portion of the coupling member to engage with an inner circumferential surface of the hole.

16. The coupling method according to claim 15, the coupling member being connected by welding with respect to an end of the piston rod, wherein the connecting the coupling member to the piston rod, and the pressing the coupling member, which is inserted through the hole, in the axial direction and expanding the coupling member in diameter to engage with the inner circumferential surface of the hole are performed substantially simultaneously.

17. A coupling structure for a piston used in a fluid pressure cylinder, comprising:
 a coupling member, the coupling member includes:
  a main body portion in contact with and connected to an end of a piston rod, and
  an outer edge portion formed on an outer circumferential side of the main body portion and connected to the piston, and the outer edge portion is inclined toward an axial direction of the piston and the piston rod with respect to the main body portion, wherein
 the fluid pressure cylinder includes a cylinder main body to which a pressure fluid is introduced to an interior thereof, the piston disposed displaceably in the interior of the cylinder main body, and the piston rod connected to the piston, the coupling structure being adapted to couple the piston with respect to the piston rod, and
 a hole is formed in a center portion of the piston, the hole extending in an axial direction with a diameter larger than an outside diameter of the piston rod, and between the piston and the piston rod, the coupling member, which is elastically deformable and is greater in diameter than the outside diameter of the piston rod, is provided to couple the piston and the piston rod, and the coupling member is connected with respect to the end of the piston rod.

* * * * *